No. 622,659. Patented Apr. 11, 1899.
N. BENDIXEN.
METHOD OF AND APPARATUS FOR STERILIZING MILK.
(Application filed Oct. 28, 1898.)
(No Model.) 2 Sheets—Sheet 1.
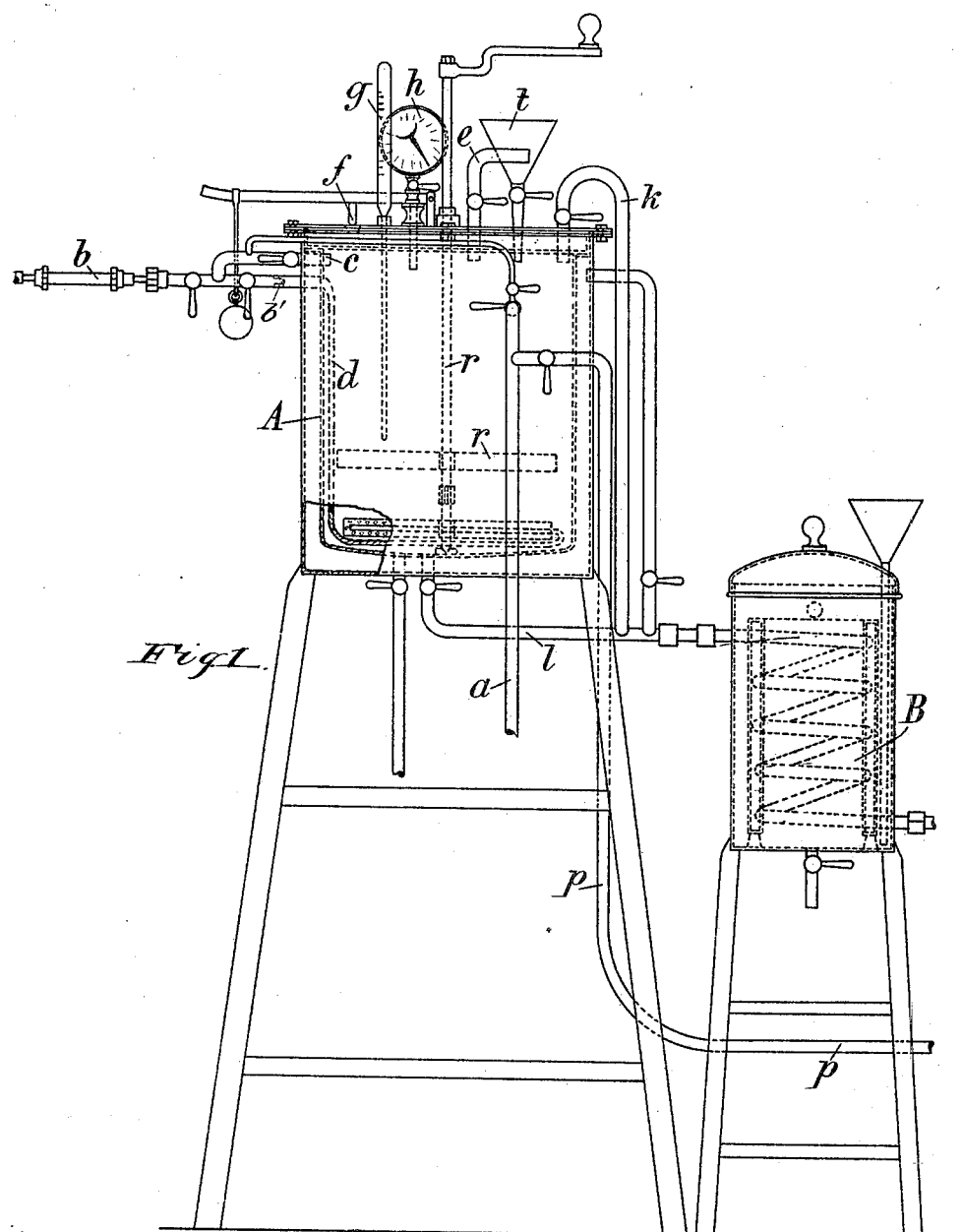

No. 622,659. Patented Apr. 11, 1899.
N. BENDIXEN.
METHOD OF AND APPARATUS FOR STERILIZING MILK.
(Application filed Oct. 28, 1898.)
(No Model.) 2 Sheets—Sheet 2.
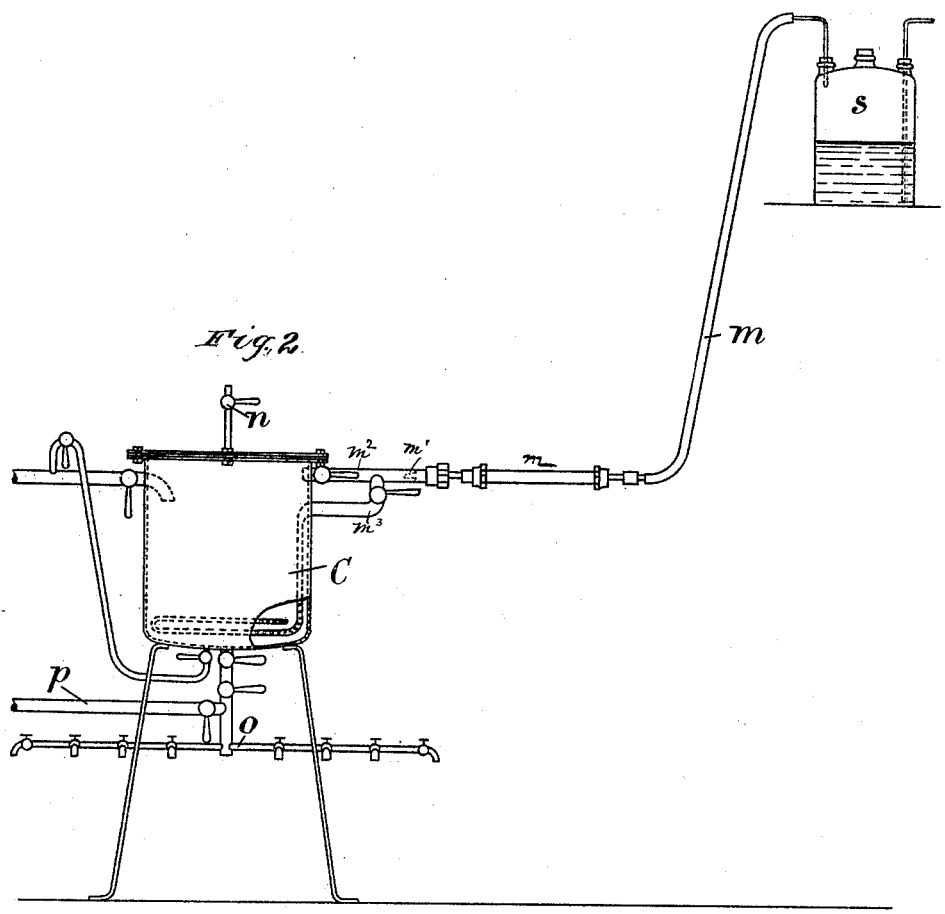

UNITED STATES PATENT OFFICE.

NIELS BENDIXEN, OF COPENHAGEN, DENMARK.

METHOD OF AND APPARATUS FOR STERILIZING MILK.

SPECIFICATION forming part of Letters Patent No. 622,659, dated April 11, 1899.

Application filed October 28, 1898. Serial No. 694,855. (No model.)

*To all whom it may concern:*

Be it known that I, NIELS BENDIXEN, superintendent of a laboratory, of Hauchs Vej 16, Copenhagen, Denmark, have invented certain new and useful Improvements in the Method of and Apparatus for Sterilizing Milk; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention refers to a method of and apparatus for sterilizing milk by boiling under such conditions and treatment that all the valuable qualities of fresh milk are retained by the latter.

It is well known that milk when heated to boiling-point assumes a peculiar taste, which considerably reduces its value for use. Experiments have been made to avoid this taste by removing the atmospheric air from the vessel in which the heating takes place, as it has been correctly presumed that the oxygen plays an important part in producing this taste, and very satisfactory results have been obtained this way in ordinary pasteurizing of milk. If, however, in order to obtain a really sterile milk in which the sporuliferous bacteria are killed, this heating is not sufficient. The milk must then be heated to above the boiling-point, as is the case in the present method; but in this case the boiled taste cannot be avoided by a mere exclusion of the atmospheric oxygen.

The feature of the present invention consists in saturating the milk with carbonic acid before boiling, whereby the atmospheric air is driven out, and then boiling under pressure at a temperature of about 120° Celsius. In this way the boiled taste is not only completely avoided, but the milk is not submitted to any of the ordinary alterations which generally follow with the boiling. Thus it does not form a skin, it is not discolored, and retains the quality of depositing cream.

Concerning the part taken by the carbonic acid only more or less reliable presumptions may be put forward on the basis of experiments performed. They, however, show clearly enough that the exclusion of the oxygen is merely a part of the total action. Under ordinary circumstances the lime contained in the milk will during the boiling process presumably cause the formation of changeable compounds between the said matter and sugar of milk, and these compounds will decompose by the heat during further alterations in the molecules of the sugar. If, however, there is a surplus of carbonic acid, this will bind the lime, and the sugar of milk will remain unaltered in spite of the proportionately great heat. A similar effect will be produced as to the albumen, as it is well known that phosphate of lime always forms a subordinate part or attendant thereof. Even if reliable results as to the importance of the phosphate of lime in a chemical sense are missing its appearance makes it easily explainable that the carbonic acid may have the result proved by the experiments—namely, to prevent the albumen from changing during the heating process.

After the milk, as described, has been boiled under pressure when saturated with carbonic acid it is cooled off and is then perfectly sterile. It contains, however, still carbonic acid, which may be shown by its taste, and in order to restore the latter to that of fresh milk it becomes necessary again to remove the carbonic acid and to replace it with atmospheric air. This is performed simply by passing a current of sterile air through the milk. The air will then partly carry the carbonic acid with it and will be partly absorbed by the milk until this is saturated therewith, as is the case with fresh milk. In this way it becomes possible to produce a milk which retains all the qualities of fresh milk and which, moreover, lasts fresh for a long time and may be used without any danger of contagion, as germs such as tubercle-anthrax and colibacteriæ are absolutely destroyed by the boiling under pressure.

In the accompanying drawings I have shown apparatus for the treatment of milk according to the present invention, and wherein—

Figure 1 shows the heating and cooling apparatus, and Fig. 2 the apparatus for treating the milk with air in the final step of the process.

A is a container for heating and treating the milk with carbonic acid, B a cooling apparatus, and C a container for removing the carbonic acid by means of sterilized air for drawing off the milk.

The apparatus is used in the following manner: After all the containers and tubes have been sterilized by passing steam through them the milk is poured through a funnel $t$ into the container A, which has double walls, while carbonic acid from any source is led through the tube $b$, having a filter $b'$ therein. This tube has two branches $c$ and $d$, the first of these opening into the container A immediately above the level of the milk, while the other, $d$, is continued down to the bottom of the container, where it is perforated. Through the holes the carbonic acid passes in small bubbles up through the fluid and escapes, together with the atmospheric air, through a tube $e$, the other valves of the container being kept closed. The filling in of carbonic acid is continued while the fluid is agitated by the stirrer $r$ until pure carbonic acid comes out, and steam is then, while the stirring is continued, led through the tube $a$ into the interstice between the walls of the container A. The supply of carbonic acid is then shut off, also the outlet-tube $e$, and the steam-supply is continued until the fluid boils. The steam which is developed escapes through a safety-valve $f$, whose counterbalance decides the temperature and pressure, which may be read off by a thermometer $g$ and a monometer $h$. It will generally be preferable to work with a pressure of about two atmospheres, which correspond to a temperature of about 120° Celsius. To prevent condensation of the milk during the boiling, the steam may also be led through a tube $k$ to the cooling apparatus B, where it is condensed and where the distilled fluid is kept for subsequent mixing with the bulk of the milk.

In ordinary circumstances it will be best to continue the boiling for half an hour; but the boiling may, however, if desirable, be prolonged for any time without danger of altering the milk. The milk is then led through the tube $l$ to the cooling apparatus B, which consists of a cooling-coil in running water, through which the milk passes over into another container C. An air-tube $m$, having a filter $m'$ therein, has a branch $m^2$, leading to the upper part of air-tight container C and a branch $m^3$, terminating in the lower part of said container in a perforated loop. Through the perforated tube $m^3$ on the bottom of the container the air passes through the milk and escapes through a valve $n$ in the cover. The container is provided with a tube $o$, which has a row of faucets, and these are before use sterilized by steam through the tube $p$ and permit a drawing off of the sterilized fluid.

The air which is brought to the container C must before it passes through the filter be purified by allowing it to bubble through cleaning-bottles $s$, filled with sulfuric acid, soda-lye, solution of permanganate of potassium, and the like.

Having now particularly described and ascertained the nature of my said invention and in what manner the same is to be performed, I declare that what I claim is—

1. The method of sterilizing milk while retaining all the qualities of fresh milk, consisting in saturating the milk with carbonic acid and thereby driving out the air, then boiling under pressure at a temperature of about 120° Celsius, then removing the carbonic acid and saturating the milk with air by leading a current of sterilized air through it.

2. Apparatus for sterilizing milk, consisting of a heating vessel provided with tubes for feeding carbonic acid to its interior, means for heating its contents, and an agitator, a cooling vessel connected to said heating vessel by tubes leading into the upper and lower parts of the latter, so as to lead developed steam or treated fluid through said cooling-chamber, and a third vessel connected with the cooling-chamber by a pipe and provided with means for charging the milk with air.

In testimony that I claim the foregoing as my invention I have signed my name in presence of two subscribing witnesses.

NIELS BENDIXEN.

Witnesses:
ERIK AAGE CHRISTENSEN,
SIGURD CHRISTENSEN.